United States Patent [19]

Levin et al.

[11] Patent Number: 5,379,906
[45] Date of Patent: Jan. 10, 1995

[54] FOLDABLE ORGANIZER

[76] Inventors: Lev J. Levin, 107 Van Buskirk Ave., Stamford, Conn. 06902; Semyon Krislav, 18 Eliot La., Stamford, Conn. 06903

[21] Appl. No.: 27,039

[22] Filed: Mar. 5, 1993

Related U.S. Application Data

[63] Continuation-in-part of Ser. No. 911,054, Jul. 9, 1992, abandoned.

[51] Int. Cl.6 ............................................. A47F 5/00
[52] U.S. Cl. .................................... 211/195; 211/12; 224/42.42
[58] Field of Search ............... 211/195, 85, 132, 12; 220/6; 229/120.33, 120.36; 224/42.42, 311

[56] References Cited

U.S. PATENT DOCUMENTS

| | | | |
|---|---|---|---|
| 3,986,656 | 10/1976 | November | 229/15 |
| 4,029,244 | 6/1977 | Roberts | 224/42.42 |
| 4,189,056 | 2/1980 | Majewski | 211/195 |
| 4,226,348 | 10/1980 | Dottor et al. | 224/42.42 |
| 4,718,584 | 1/1988 | Schoeny | 224/42.42 |
| 4,951,867 | 8/1990 | McManus | 229/120.31 |
| 5,036,979 | 8/1991 | Selz | 206/512 |
| 5,163,569 | 11/1992 | Buff | 211/201 |
| 5,230,690 | 7/1993 | Adkinson | 493/311 |

*Primary Examiner*—Robert W. Gibson, Jr.
*Attorney, Agent, or Firm*—David P. Gordon

[57] ABSTRACT

A foldable organizer includes a number of panels hingedly coupled to each other to form a number of defined compartments. The hinged couplings between panels allow the panels to hinge relative to each other preferably through approximately 180 degrees or more. The organizer is foldable to collapse one or more compartments and the area of each compartment is infinitely adjustable so that the organizer can be adjusted to fit in different sized spaces. Expanding the organizer to its maximum allowable size within a given space keeps the organizer secure from movement. The foldable organizer is advantageously used in the trunk of an automobile to protect grocery bags from spilling their contents when the automobile is in motion. The organizer can be constructed from a single flat blank which is cut, folded and fastened or from several such blanks. A kit containing one or more blanks with appropriate fasteners is also disclosed.

21 Claims, 6 Drawing Sheets

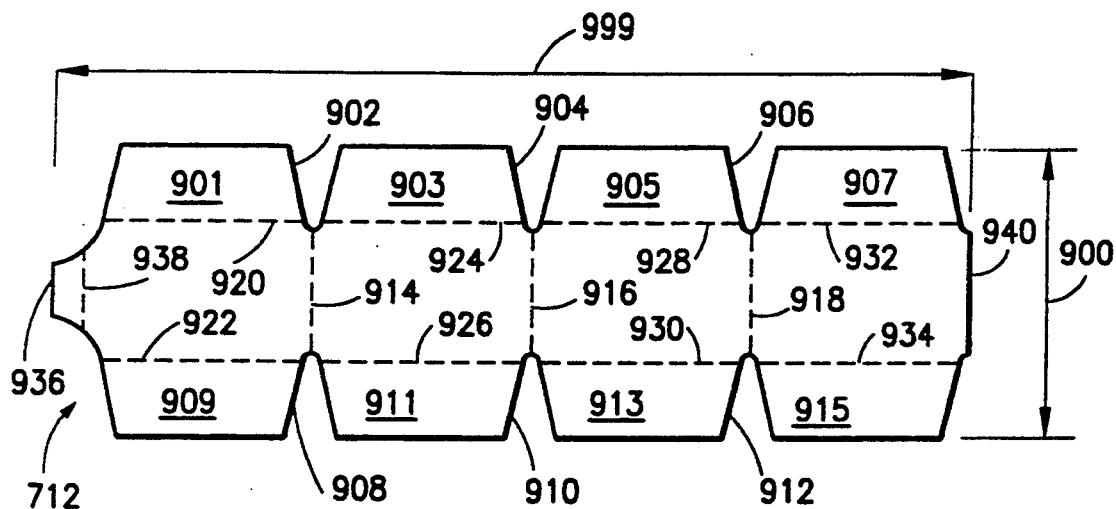
FIG. 8
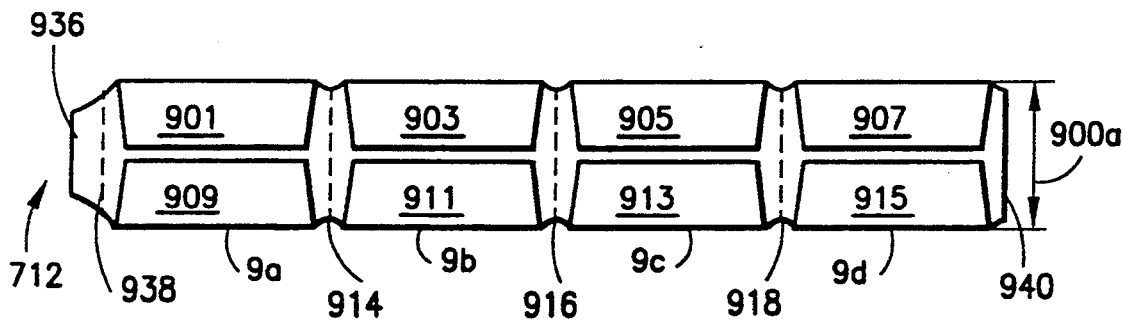
FIG. 9
FIG. 10
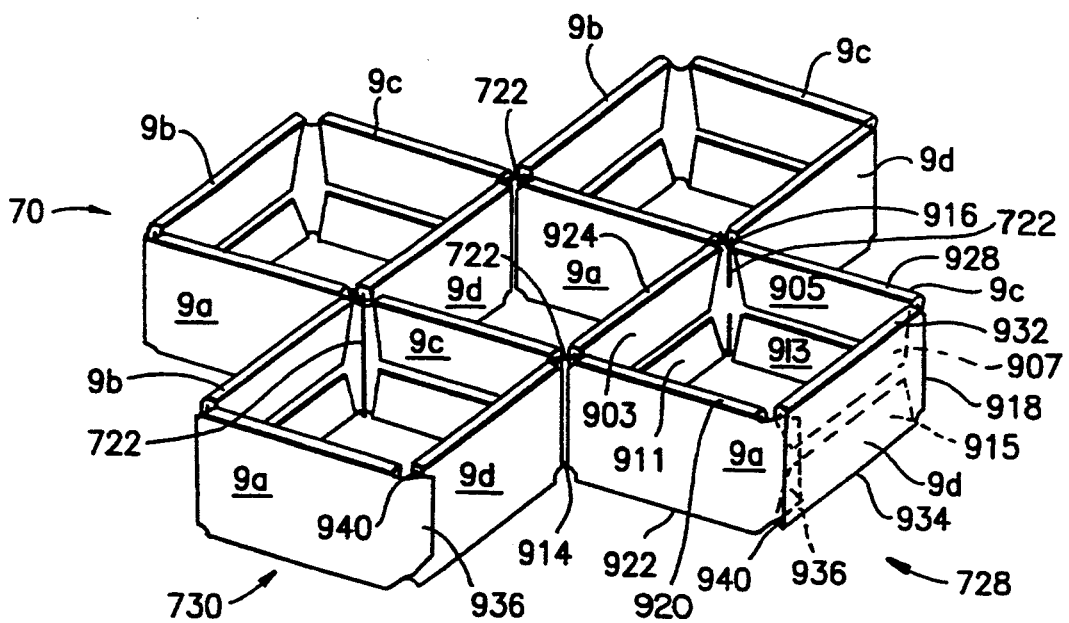

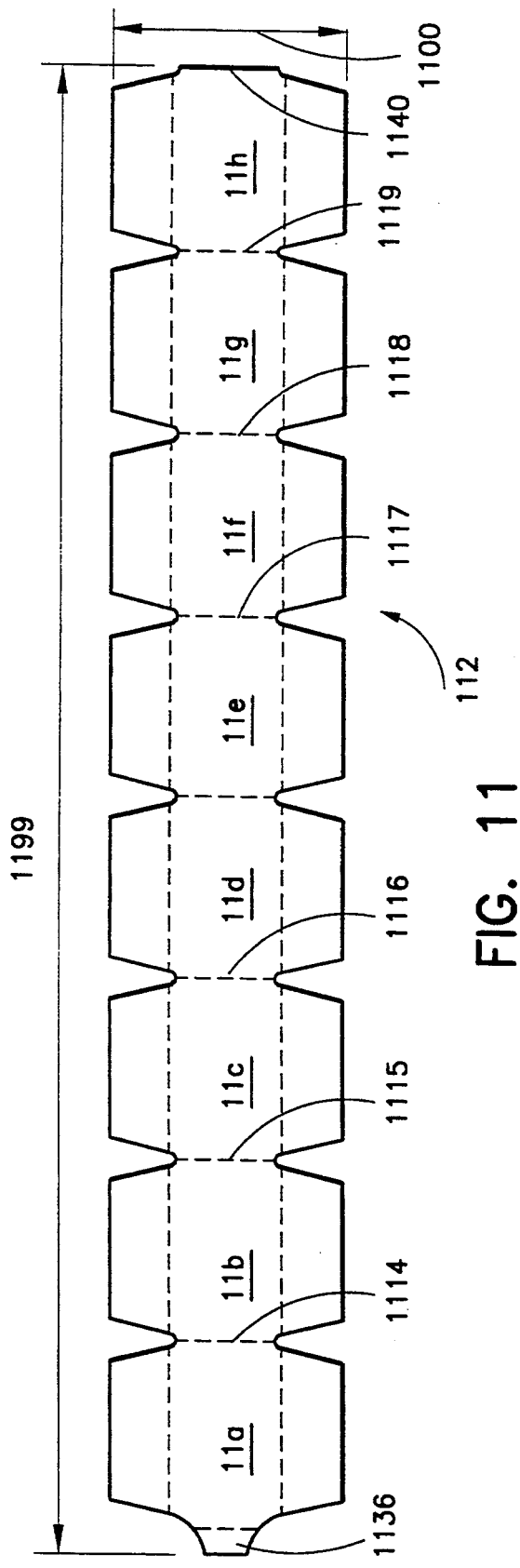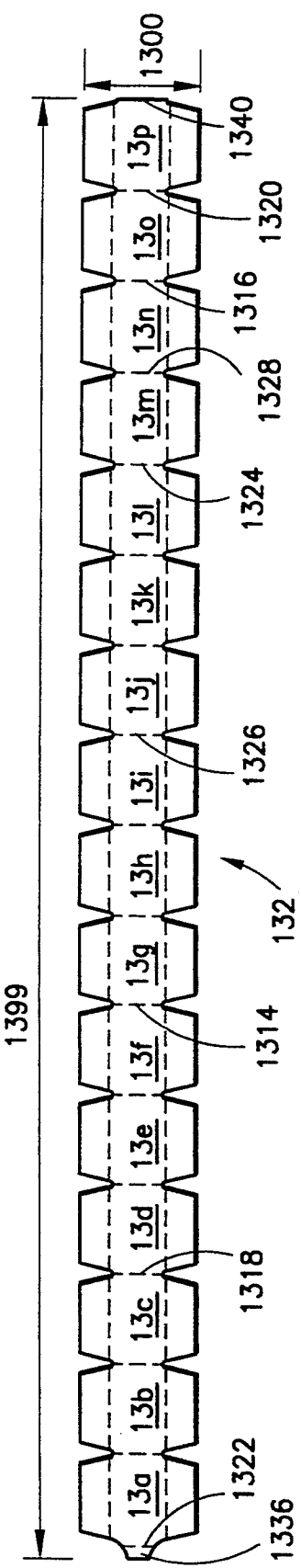

FOLDABLE ORGANIZER

This application is a continuation-in-part of application Ser. No. 07/911,054 filed Jul. 9, 1992 abandoned.

BACKGROUND OF THE INVENTION

1. Field of the Invention

The present invention relates to a foldable structure having collapsible compartments. More particularly, the invention relates to a multi-compartment defining structure which is foldable to collapse one or more compartments.

2. State of the Art

Collapsible structures having compartments for organizing and protecting different items such as grocery bags in the trunk of an automobile are well known in the art. U.S. Pat. No. 3,986,656 to November discloses a collapsible package holding structure for dividing the area of a car trunk to hold grocery bags securely during transport. November's area divider consists of several cardboard panels having slots and folds which may be assembled to form a rectangular structure with up to seven internal compartments. While November's structure is collapsible, it is not adjustable in its outer dimensions. It may be collapsed into an unusable disassembled storage condition or assembled to its full size for use. The number and shape of compartments inside the fixed size rectangular structure may be varied, but the outer dimensions of the rectangular frame remain fixed and the dimensions of the inner compartments are only partly adjustable.

U.S. Pat. No. 4,029,244 to Roberts discloses another type of collapsible structure for use in transporting grocery bags. Roberts teaches a railed support stand for preventing grocery bags from spilling. The stand is constructed from seven segments having upper and lower rails connected by risers forming ladder-like structures. Segments are hingedly joined so that the stand folds from a closed position to an open position having two compartments. Each compartment is a rectangular structure with hinges at each of four corners. The two rectangular compartments share a common side. Roberts' stand is somewhat more flexible than November's, but it is costly having many components and moving parts. Moreover, it is not readily adjustable for use in different sized spaces. Although one of the two compartments may be folded closed to shorten the overall length of the structure, this results in a corresponding increase in the overall width of the structure.

A folding separator with an adjustable outer dimension is disclosed in U.S. Pat. No. 4,951,867 to McManus. In one embodiment of the invention, McManus shows a folding cardboard structure similar to November's fixed rectangular outer structure but with extra folds in two opposite sides of the rectangular structure so that its overall width may be adjusted without affecting its overall length. Nevertheless, the overall length of McManus' folding separator remains fixed.

Thus, it will be appreciated that while many of the known collapsible folding structures have definite advantages and are useful for their intended purpose of preventing unwanted movement of packages in the trunk of an automobile while it is in motion, they all suffer a common drawback. None of the known structures is fully adjustable as to its overall size. This is a serious disadvantage since the space available for such a structure in an automobile trunk is not definite or predictable. Automobile trunks vary in size considerably and depending on other contents in the trunk, such as a spare tire, the space available for an organizing structure is tremendously variable. So in many cases, the known organizing structures prove useless since they cannot fit in the limited space available for them.

SUMMARY OF THE INVENTION

It is therefore an object of the invention to provide a multi-compartment foldable organizer which is adjustable in overall size.

It is also an object of the invention to provide a foldable organizer which includes a selectable number of compartments.

It is another object of the invention to provide a foldable organizer where any of its compartments may be selectively collapsed.

It is still another object of the invention to provide a foldable organizer where the area of each compartment is infinitely adjustable.

It is yet another object of the invention to provide a foldable organizer which is inexpensive to manufacture.

It is still another object of the invention to provide a foldable organizer which will collapse to a substantially flat configuration.

It is yet another object of the invention to provide a foldable organizer which is light weight.

In accord with these objects which will be discussed in detail below, the foldable organizer of the present invention includes a plurality of collapsible compartments each having a plurality of rectangular panels hingedly coupled to each other at two opposite sides such that each hinged coupling has a hinging range of 90° or more, and preferably of approximately 180° or more.

Preferred aspects of the foldable organizer include forming all of the panels with substantially identical dimensions and using multiples of four panels. The panels are preferably made of corrugated cardboard, plastic, or other light weight inexpensive material. Hinged couplings may be constructed from tape or cloth, or preferably constructed as integral live hinges between panels formed from a flat blank. The preferred embodiment of the invention is constructed from one or more flat blanks defining a multiple of four in-line panels. The blank is folded and opposite ends of the blank are glued or otherwise fastened to provide an endless group of hinged panels in multiples of four. Groups of panels may be joined to each other at one or more hinges to form a larger foldable organizer. A preferred clip device having a substantially C-shape with free ends close together is used to couple groups of panels.

Additional objects and advantages of the invention will become apparent to those skilled in the art upon reference to the detailed description taken in conjunction with the provided figures.

BRIEF DESCRIPTION OF THE DRAWINGS

FIG. 8 is a plan view of a cardboard blank for creating one of the modules of FIG. 6;

FIG. 9 is a plan view of the blank of FIG. 8 partially folded;

FIG. 10 is a perspective view of four modules, each created from a blank as shown in FIG. 8;

FIG. 11 is a plan view of a cardboard blank for creating an 8-panel module according to a third embodiment of the invention;

FIG. 13 is a plan view of a cardboard blank for creating a 16-panel module according to a fourth embodiment of the invention.

DETAILED DESCRIPTION OF THE PREFERRED EMBODIMENTS

Figure 1:
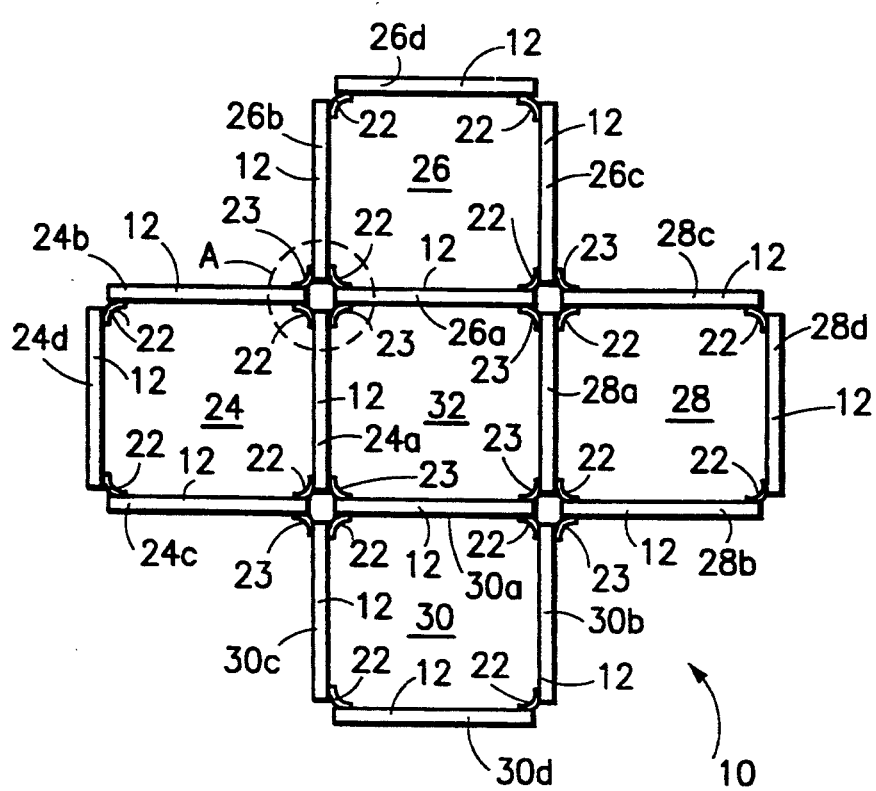
FIG. 1 is a plan view of a first embodiment of the invention having sixteen panels.
Figure 2:
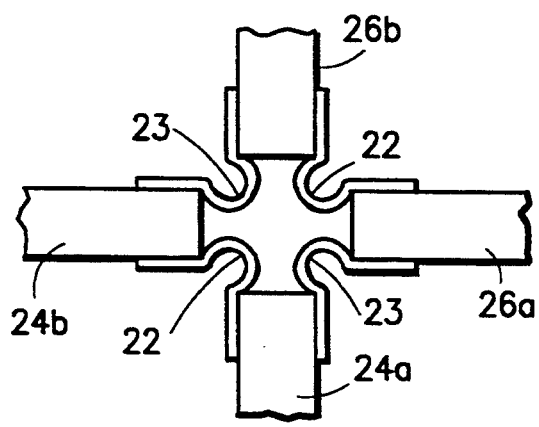
FIG. 2 is a close view of area A in FIG. 1 showing a first embodiment of joints between panels.

Referring now to FIGS. 1 through 5, a foldable organizer 10 according to a first embodiment of the invention includes sixteen rectangular panels 12 attached to each other by fabric strips 22 and 23. Arranged as shown in FIG. 1, the sixteen panels form five compartments 24, 26, 28, 30, and 32. It will be appreciated that compartments or modules 24, 26, 28, and 30 are each formed from four panels 12 internally joined at their edges with fabric strips 22 to form four sides (a,b,c,d). These four discrete compartments 24, 26, 28, and 30 are arranged so that the "a" side of each forms a fifth compartment 32. Thus, compartment 32 is defined by side 24a from compartment 24, side 26a from compartment 26, side 28a from compartment 28, and side 30a from compartment 30. Compartments 24, 26, 28, and 30 are externally joined to each other with fabric strips 23 to form the fifth compartment 32 and thereby couple all of the compartments to form a single foldable unit 10. For example, as shown in FIG. 1, side 26a of compartment 26 is externally joined by a fabric strip 23 to side 24a of compartment 24; side 26b of compartment 26 is externally joined by another fabric strip 23 to side 24b of compartment 24. Similarly, side 24c of compartment 24 is joined to side 30c of compartment 30 by another fabric strip 23 and so on.

The rectangular panels 12 which form the sides of the compartments described above may be formed of any suitable material such as plastic, corrugated cardboard, or the like. The fabric strips 22, 23 used in the first embodiment of the invention may be glued to the edges of the panels or attached in any other suitable way. Moreover, the fabric strips 22, 23 may be plastic material, tape, or any other suitable flexible material as will be appreciated by those skilled in the art after reading the complete disclosure herein. It will be appreciated, however, that the strips 22, 23 must be dimensioned and spaced relative to the thickness of panels 12 such that the panels are foldable relative to each other as will be described in more detail below.

Figure 3:
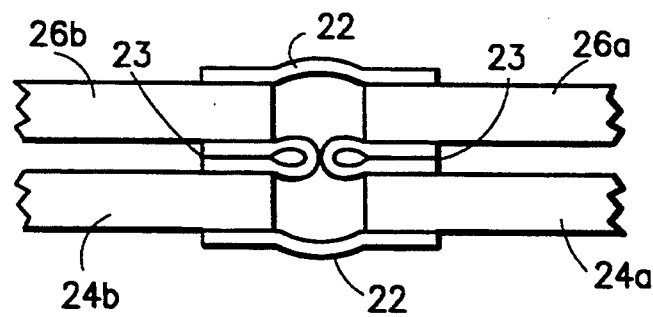
FIG. 3 is a view similar to FIG. 2 showing the panels folded flat.
Figure 4:
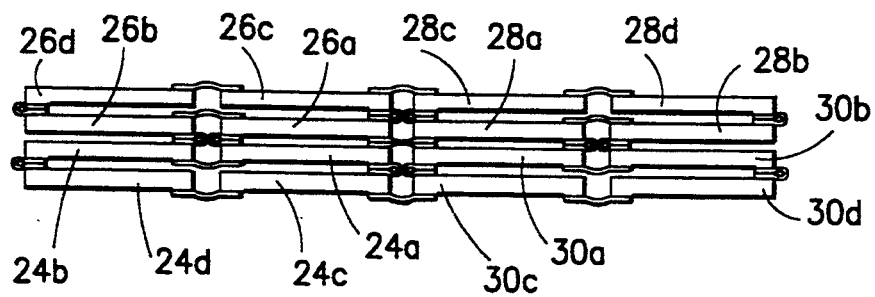
FIG. 4 is a plan view of the embodiment of FIG. 1 in the fully collapsed position.
Figure 5:
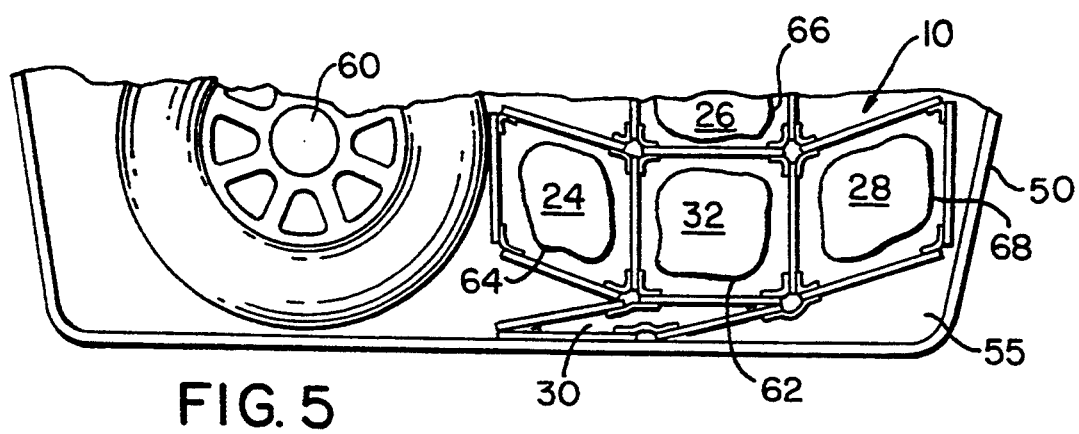
FIG. 5 is a top view of the embodiment of FIG. 1 in a partially folded condition.

Turning now to FIGS. 3-5, it will be appreciated that the hinged connections 22, 23 between panels 12 are sufficient to allow the panels to hinge relative to each other through a range of approximately 180°. Thus, when the compartments 24, 26, 28, 30, 32 are empty, the panels may be folded to lie substantially flat against each other as shown in FIGS. 3 and 4. It will be appreciated that while FIG. 1 shows the foldable organizer 10 in its fully expanded configuration, FIG. 4 shows the organizer 10 in its fully collapsed configuration. It should be recognized, however, that intermediate of its fully expanded and fully collapsed configurations, the foldable organizer 10 may be partially collapsed to close one or more compartments as desired.

FIG. 5 shows the foldable organizer 10 with compartments 24, 28, and 30 partially collapsed so that the organizer fits in an automobile trunk 50 alongside spare tire 60. As shown, only compartment 30 is substantially closed. Compartments 24 and 28 are only slightly collapsed so that the overall dimensions of the organizer are adjusted to fit in the limited space available in the automobile trunk 50. FIG. 5 shows four grocery bags 62, 64, 66, 68 occupying respective compartments 32, 24, 26, 28. Thus, it will be appreciated that according to the the invention, the compartments of the organizer are adjustable from a fully opened to a fully closed position through an infinite number of intermediate positions, many of which intermediate positions are still useful for organizing and protecting items such as the grocery bags shown in FIG. 5. It will also be appreciated that because of the overall configuration of the organizer 10, additional compartments, e.g. 55, may be created between the outer walls of the organizer and the walls of the space in which the organizer is placed. It will also be appreciated that while it is preferred that the hinged connections between panels allow a hinge range of 180° or more, it is possible to construct a useful organizer where the hinge range is only 90° such that, e.g., the compartments collapse in one direction only.

Figure 6:
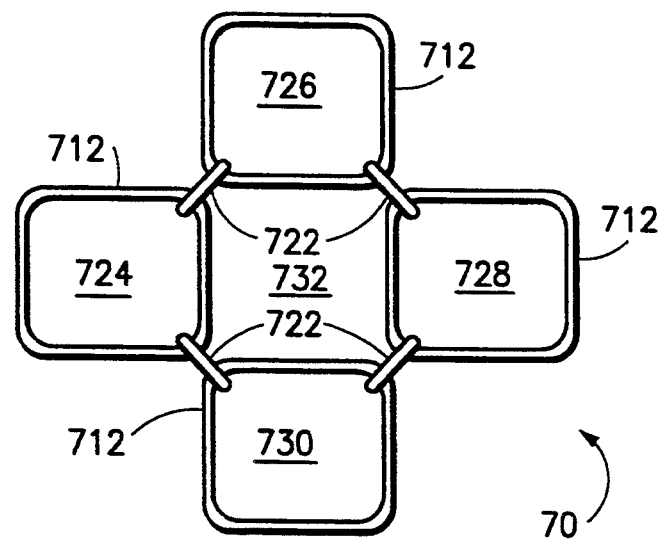
FIG. 6 is a plan view of a second embodiment of the invention having four 4-panel modules.
Figure 7A:
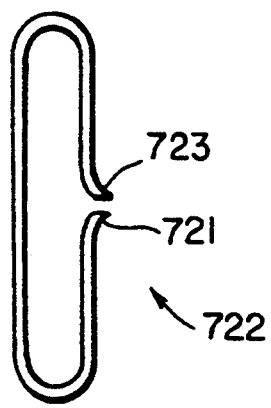
FIG. 7a is a side view of a connecting clip used to couple modules of the second embodiment.
Figure 7B:
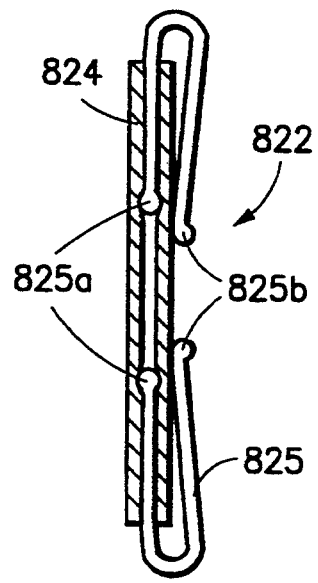
FIG. 7b is a view of a second embodiment of a connecting clip used to couple modules together.
Figure 7C:
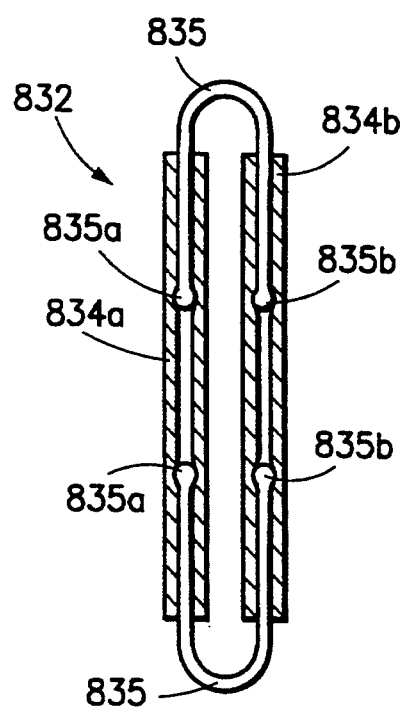
FIG. 7c is a view of a third embodiment of a connecting clip used to couple modules together.

Turning now to FIGS. 6-10, a second embodiment of the foldable organizer 70 includes four 4-panel modules 724, 726, 728, 730 and four resilient connecting clips 722. Each 4-panel module is formed from a flat blank 712 which is cut and folded as described below. The resilient connecting clips 722 couple corners of each module as shown in FIGS. 6 and 10 to form a contiguous space 732 substantially the same size as the space within each module 724, 726, 728, 730. As seen in FIG. 7a, according to one embodiment of the invention, the connecting clip 722 is a substantially C-shaped resilient member having two free ends 721, 723 which are relatively close together. The connecting clip 722 must be very flexible and resilient so that at least one of its ends may be bent out of the way in order place the clip over the hinges of two adjacent modules, and then resume its shape when released. Alternatively, as seen in FIG. 7b, the connecting clip (822) may take the form of a flexible tube 824 and two bobby pins 825 where the bobby pins have one end 826a inserted into the tube and one end 825b free to extend over the hinged areas of the modules. The bobby pins 825 are preferably chosen to be of a length and thickness such that two bobby pins extend along almost the entire length of the flexible tube, and such that the bobby pins slightly deform the flexible tube when mating therewith. As a result, the connecting clip 822 forms into a substantially C-shaped clip which will hold two adjacent modules together, and the connection can be made by sliding one end 825a of one of the two bobby pins into the tube 824 while simultaneously sliding the free end 825b of the same bobby pin over the adjacent hinge. Another alternative clip 832 is seen in FIG. 7c where two flexible tubes 834a and 834b and two bobby pins 835 with ends 835a and 835b which engage the tubes 834a and 834b are provided. In the clip 832 of FIG. 7c, one bobby pin may be inserted into one end of each tube 834a and 834b prior to clipping modules together, and the partially assembled clip may be slid over adjacent corners or a module. Then, the ends of the other bobby pin may be slid into the open ends of the tubes 834a and 834b to complete the clip. As indicated in FIG. 7c, when assembled, clip 832 takes an O-shape. It will also be appreciated that in lieu of clips 722, 822, or 832, an encircling string or wire may be satisfactorily used to couple adjacent corners of the modules as shown. Regardless, after modules are arranged with corners adjacent as shown in FIGS. 6 and 10, the clips 722 (or 822) are secured around adjacent corners as shown in a manner which will be understood from the drawings.

As can be seen in FIGS. 8 and 9, blank 712 from which each 4-panel module is formed is a substantially rectangular flat sheet of corrugated cardboard such as "200 lb. test corrugate B- flute" or another cardboard, plastic or suitable material. Blank 712 has an overall width indicated at 900 of preferably approximately 12 inches and an overall length indicated at 999 of preferably approximately 50 inches. As can be seen in FIG. 9, blank 712 is provided with six equally spaced substantially U-shaped cut- outs 902, 904, 906, 908, 910, 912 which define four substantially identical pairs of ears: 901, 909; 903, 911; 905, 913; 907, 915. Each ear has a width slightly less than approximately one fourth of the overall width of the blank and a length slightly less than approximately one fourth of the overall length of the blank and is foldable along a respective fold line 920, 922, 924, 926, 928, 930, 932, 934. One end of the blank 712 is preferably provided with an extending tongue flap 936 which is foldable along a fold line 938 and which ultimately engages free end 940 at the opposite end of the blank. In the preferred embodiment, tongue flap 936 (folded at fold line 938) extends approximately 2 inches beyond fold line 938.

When ears 901, 909; 903, 911; 905, 913; 907, 915 are folded along respective fold lines 920, 922, 924, 926, 928, 930, 932, 934 as shown in FIG. 9, the blank 712 assumes an overall width as indicated at 900a of approximately half the overall width (900 in FIG. 8) before folding. In the preferred embodiment, the overall width 900a is approximately 6 inches. The partially folded blank 712 shown in FIG. 9 thus defines four reinforced (substantially two-ply) panels 9a, 9b, 9c, 9d separated by fold lines 914, 916, 918. A module (724, 726, 728, 730) is formed by folding panels 9a, 9b, 9c, and 9d along fold lines 914, 916, 918 and attaching tongue flap 936 to free end 940, as shown in FIG. 10.

FIGS. 10 and 6 show four modules 724, 726, 728, 730 coupled at adjacent corners with clips 722. As can be seen in FIG. 10, tongue flap 936 may be attached to free end 940 in any of several manners. As seen with respect to module 730, the tongue flap 936 is simply glued to one side of the free end 940. As seen with respect to module 728, however, tongue flap 936 may be inserted under ears 907, 915 and either glued or stapled or secured in any other suitable manner.

From the description in connection with FIGS. 6–10, it will be appreciated that the dimensions of the cutouts 902, 904, 906, 908, 910 and 912 will depend to some extent on the thickness of the material used to form blank 712. Moreover, the placement of fold lines 920, 922, 924, 926, 928, 930, 932 and 934 will also depend to a certain extent on the thickness of the material used. It will be understood by those skilled in the art of constructing containers from blanks having cut lines and fold lines, that the dimensions and depictions above are approximate. It will also be understood that the shaping of the U-shaped cutouts is designed to provide a single-ply hinge-like area between adjacent reinforced double-ply panels. In this regard, the length and attachment of the tongue flap to the free end should also be arranged to provide a hinge-like area between the panels connected. Finally, it will be appreciated that the hinge-like areas should be sufficiently large enough to accommodate the clip 722 and still allow folding of the panels of the modules through a range of approximately 180° or more.

Figure 12:
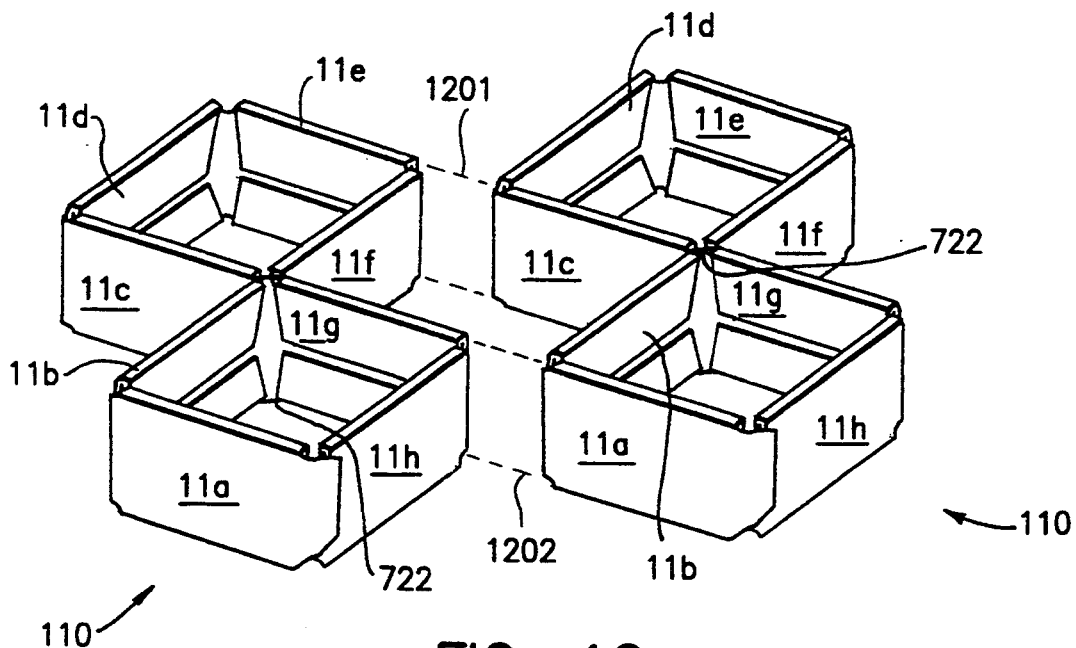
FIG. 12 is a perspective view of two 8-panel modules, each created from a blank as shown in FIG. 11.

With the benefit of the above disclosure, the third embodiment of the invention shown in FIGS. 11 and 12 will be readily understood. The embodiment of FIGS. 11 and 12 is very similar to the embodiment of FIGS. 6–10 except that each module is an 8-panel module rather than a 4-panel module. The modules 110 are constructed from blanks 112 in substantially the same manner as the modules described above with reference to FIGS. 6–10. As will be appreciated from FIG. 12, however, the resulting module has eight panels 11a–11h forming two compartments per module. The hinge-like portion formed by fold line 1115 between panels 11b and 11c is coupled to the hinge-like portion formed by fold line 1118 between panels 11f and 11g by a clip 722 as described above. The resulting module 110 assumes a "double diamond" configuration. Two or more modules 110 may be coupled by coupling adjacent corners as indicated by dashed lines 1201, 1202 in FIG. 12. In FIG. 12, the hinge-like portion formed by fold line 1117 between panels 11e and 11f of a first module is coupled to the hinge-like portion formed by fold line 1116 between panels 11c and 11d of a second module by a clip 722; and hinge-like portion formed by fold line 1119 between panels 11g and 11h of the first module is coupled to the hinge-like portion formed by fold line 1114 between panels 11a and 11b of the second module by a second clip 722.

Figure 14:
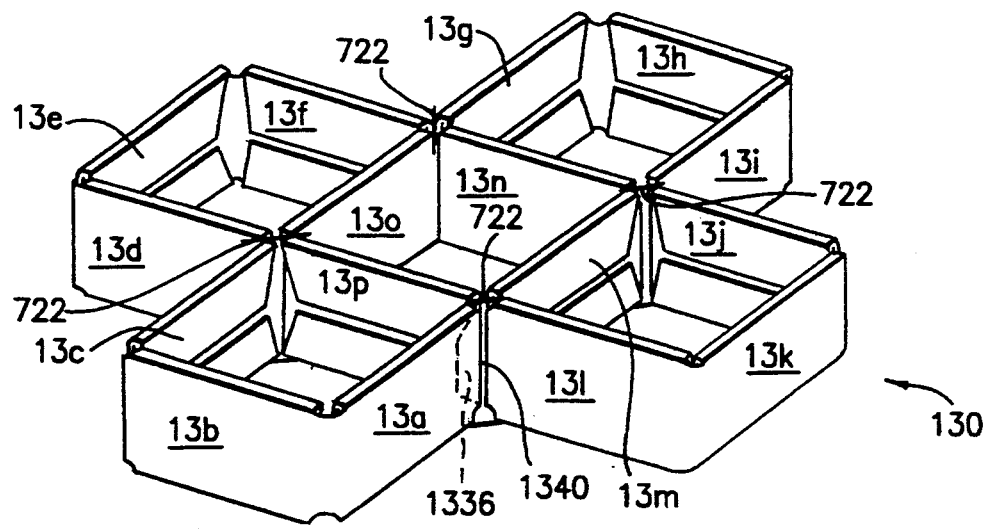
FIG. 14 is a perspective view of a 16-panel module created from the blank of FIG. 13.

With the benefit of the disclosure thus far, the fourth embodiment of the invention shown in FIGS. 13 and 14 will be readily understood. Turning now to FIGS. 13 and 14, a 16-panel module 130 is shown as formed from a 16-panel flat blank 132. It will be appreciated that the blank 132 is substantially the same as blanks 112 and 712 described above except that its length 1399 is longer. In this embodiment, blank 1399 is approximately twice as long as blank 112 or approximately four times as long as blank 712. It will be understood that the width 1300 of blank 132 is substantially the same as the width of blanks 112 and 712. Blank 132 is folded in a similar manner as the blank 712 shown in FIG. 9 resulting in a a strip of sixteen substantially double- ply panels separated by fifteen substantially single-ply hinge- like areas. Tongue flap 1336 and free end 1340 are substantially the same as the tongue flaps and free ends described above. After folding, the blank 132 is arranged in a somewhat different manner from the blanks described above. FIG. 14 shows how the folded blank 132 is arranged to form five compartments. Tongue flap 1336 and free end 1340 are coupled as described above and the panels are folded at their hinge-like separating areas as shown in FIG. 14. Four clips 722 couple adjacent hinge-like portions: the hinge-like portion formed by fold line 1314 between panels 13f and 13g is coupled to the hinge-like portion formed by fold line 1316 between panels 13n and 13o by a clip 722; hinge-like portion formed by fold line 1318 between panels 13c and 13d is coupled to the hinge-like portion formed by fold line 1320 between panels 13o and 13p by a second clip 722; hinge- like portion formed by fold line 1322 between panels 13a and 13p (between tongue flap 1336 and panel 13a) is coupled to the hinge-like portion formed by fold line 1324 between panels 13l and 13m by a third clip 722; hinge-like portion formed by fold line 1326 between panels 13i and 13j is coupled to the hinge-like portion formed by fold line 1328 between panels 13m and 13n by a fourth clip 722. Thus, it will be appreciated that in FIG. 14, certain clips 722 (e.g., the clip between panels 13i, 13j and 13m, 13n) function to serve as hinges between panels of a single compartment, while certain fold lines (e.g., the line between 13i and 13j, and the line between 13m and 13n) serve as coupling means between corners of compartments.

It will be appreciated that regardless of whether the starting components are single panels, or blanks with two, four, eight, or sixteen connected panels, organizers having more than five compartments (four outer defining one inner) may be formed. For example, additional compartments may be added to the previously described embodiments, so that the final structure may have any number of compartments greater than two. While five compartments may be preferred (as shown in the Figures), it will be readily appreciated that a structure with eight or eleven compartments is easily constructed. An eight compartment structure would typically include the five compartments of FIG. 1 with two additional compartments creating a third additional compartment. The additional compartments would require the use of three additional connecting clips. Likewise, an eleven compartment structure could be created by adding two more compartments to corners which create yet another compartment. Of course, structures with different numbers of compartments may also be built in accord with the teachings of the invention.

There have been described and illustrated herein several embodiments of a foldable organizer. While particular embodiments of the invention have been described, it is not intended that the invention be limited thereto, as it is intended that the invention be as broad in scope as the art will allow and that the specification be read likewise. Thus, while particular dimensions have been disclosed, it will be appreciated that other dimensions could be utilized. Indeed, rather than providing compartments with sides of equal length (i.e., square), the compartments could have adjacent sides of different lengths (i.e., rectangular) as long as the opposite sides are of the same length. Alternatively, hexagonal (i.e., honeycomb) or octagonal arrangements could be utilized, although it is preferable that the compartments of such arrangements not be packed closely (e.g., the hexagonal inner compartment should preferably only have three hexagonal compartments around it). Also, while certain materials have been discussed, it will be recognized that other types of materials could be used with similar results obtained. For example, rather than the preferred corrugated cardboard structure with flaps, the compartments may be easily made of plastic sheets or grids with live hinges and no flaps, or of non-corrugated cardboard sheets or grids with or without flaps, or metal sheets or wire grids, etc. Moreover, while particular configurations have been disclosed in reference to connecting clips, it will be appreciated that other configurations could be used as well. Furthermore, while one embodiment of the organizer has been disclosed as having cloth or tape connections between panels, it will be understood that different types of hinged connections can achieve the same or similar function as disclosed herein. It will therefore be appreciated by those skilled in the art that yet other modifications could be made to the provided invention without deviating from its spirit and scope as so claimed.

We claim:

1. A foldable organizer, comprising:
   a) a plurality of compartments, each compartment having at least four sides;
   b) a plurality of hinge means for hingedly coupling said at least four sides, each of said at least four sides being hingedly coupled to two other of said at least four sides and being hinged through a range of at least ninety degrees; and
   c) at least one coupling means for coupling one corner of a first one of said plurality of compartments to one corner of a second one of said plurality of compartments, said first one of said plurality of compartments not sharing a common side with said second one of said plurality of compartments, wherein
   each of said plurality of compartments independently collapses at its respective hinges without necessitating the collapse of any other of said plurality of compartments.

2. A foldable organizer according to claim 1, wherein:
   at least one corner of each one of said compartments is coupled to one corner of another one of said compartments.

3. A foldable organizer according to claim 1, wherein:
   each of said four sides is hinged through a range of approximately one hundred eighty degrees.

4. A foldable organizer according to claim 1, wherein:
   each of said sides are rectangular sheets of cardboard.

5. A foldable organizer according to claim 1, wherein:
   each of said sides are rectangular sheets or grids of plastic.

6. A foldable organizer according to claim 1, wherein:
   said hinge means comprises a strip of flexible material.

7. A foldable organizer according to claim 1, wherein:
   said hinge means comprises a live hinge between adjacent sides, wherein said adjacent sides are comprised of identical material.

8. A foldable organizer according to claim 1, wherein:
   each said coupling means comprises at least one strip of flexible material.

9. A foldable organizer according to claim 1, wherein:
   said coupling means comprises a clip means.

10. A foldable organizer according to claim 1, wherein:
    all of said plurality of compartments are formed from at least one flat blank which is cut and folded, wherein said hinge means is selected from a group consisting of a fold line and a clip means.

11. A foldable organizer according to claim 10, wherein:

each said blank comprises a plurality of panels separated by interpanel fold lines, each of said panels having a pair of ears defined by ear fold lines, said ears being foldable along said ear fold lines over said panel to increase the thickness of said panel without increasing the thickness at said interpanel fold lines, a first one of said panels having a connecting tab separated from said first one of said panels by a tab fold line, said connecting tab being used to connect said first one of said panels with a last one of said panels.

12. A foldable organizer according to claim 11, wherein:

each said blank comprises a multiple of four panels separated by fold lines.

13. A foldable organizer according to claim 12, wherein:

each said blank comprises four panels separated by fold lines, said hinge means are fold lines, and said coupling means is a clip means.

14. A foldable organizer according to claim 12, wherein:

said blank comprises sixteen panels separated by fold lines.

15. A foldable organizer according to claim 1, wherein:

said clip means comprises one of a C-shaped and an O-shaped clip.

16. A foldable organizer according to claim 1, wherein:

said clip means comprises two bobby pins and at least one flexible tube, wherein each of said bobby pins has a first end in mating engagements within said at least one flexible tube.

17. A foldable organizer according to claim 2, wherein:

each of said sides are rectangular sheets or grids of plastic, and said hinge means comprises a live hinge between adjacent plastic sides.

18. A kit for constructing a foldable organizer comprising:

a) at least one flat blank having a plurality of cut lines and fold lines, said blank being foldable into a strip having a multiple of four panels to form at least one collapsible compartment, each of said panels being separated from another of said panels by a fold line, a first and last of said panels forming opposite ends of said strip of panels;

b) fastening means for permitting said opposite ends of said strip of panels to be fastened together; and c) coupling means for coupling a first fold line between a first two panels to a second fold line between a second two panels, wherein each of said plurality of compartments independently collapses at its respective hinges without necessitating the collapse of any other of said plurality of compartments.

19. A kit according to claim 18, wherein:

said multiple of four panels is sixteen panels, said fastening means comprises a tongue flap having a fold line, said tongue flap fold line being coupled to a fold line between a twelfth and thirteenth panels;

a fold line between a ninth and tenth panels being coupled to a fold line between a thirteenth and fourteenth panels, a fold line between a sixth and seventh panels being coupled to a fold line between a fourteenth and fifteenth panels, and a fold line between a third and fourth panels being coupled to a fold line between a fifteenth and sixteenth panels.

20. A kit according to claim 18, wherein:

said coupling means comprises a resilient tube and a pair of bobby pins.

21. A kit for constructing a foldable organizer comprising:

a) a plurality of flat blanks each having a plurality of cut lines and fold lines and being foldable into a strip having a multiple of four panels, each of said panels being separated from another of said panels by a fold line, a first and last of said panels forming opposite ends of said strip of panels;

b) fastening means for fastening opposite ends of said strip of panels; and c) a plurality of coupling means for coupling a first fold line from a first one of said blanks to a second fold line from a second one of said blanks, wherein each of said plurality of coupling means comprises a resilient tube and a pair of bobby pins.

* * * * *